(12) United States Patent
Adachi

(10) Patent No.: US 7,206,113 B2
(45) Date of Patent: Apr. 17, 2007

(54) ELECTRO-OPTICAL DEVICE AND ELECTRONIC EQUIPMENT

(75) Inventor: Isao Adachi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/609,495

(22) Filed: Jul. 1, 2003

(65) Prior Publication Data
US 2004/0036941 A1  Feb. 26, 2004

(30) Foreign Application Priority Data
Jul. 9, 2002  (JP) ............................ 2002-200411

(51) Int. Cl.
*G02F 1/03* (2006.01)
*G02F 1/29* (2006.01)

(52) U.S. Cl. ...................... 359/245; 359/259; 359/315

(58) Field of Classification Search ................ 359/237, 359/245, 252–254, 265–275, 259, 315
See application file for complete search history.

(56) References Cited

U.S. PATENT DOCUMENTS 5,155,612 A * 10/1992 Adachi et al. .............. 349/111
6,097,467 A    8/2000 Fujimaki et al.
6,166,848 A * 12/2000 Cammenga et al. ........ 359/267

FOREIGN PATENT DOCUMENTS

| CN | 1218154 A | 10/2001 |
|---|---|---|
| JP | A 4-240622 | 8/1992 |
| JP | 09-073088 | 3/1997 |
| JP | A 2000-19527 | 1/2000 |
| JP | 2000-267082 | 9/2000 |
| JP | A 2001-305552 | 10/2001 |

OTHER PUBLICATIONS

English-language version of Chinese Office Action dated Apr. 29, 2005 for Chinese Patent Application No. 03147189.7.

\* cited by examiner

*Primary Examiner*—Ricky Mack
*Assistant Examiner*—Jack Dinh
(74) *Attorney, Agent, or Firm*—Oliff & Berridge, PLC

(57) ABSTRACT

The invention provides an electro-optical device which displays image of high quality without forming poorly oriented regions that stem from the presence of pole-like spacers, yet achieving a high numerical aperture. Pole-like spacers according to the invention are provided on at least either one of a first substrate and a second substrate holding a liquid crystal layer and on the to-be-provided surface of the one substrate on the side facing the liquid crystal layer, the pole-like spacers having, at the roots thereof, a slope portion with a surface smoothly connecting to the to-be-provided surface.

11 Claims, 16 Drawing Sheets

FIG. 7
(a)
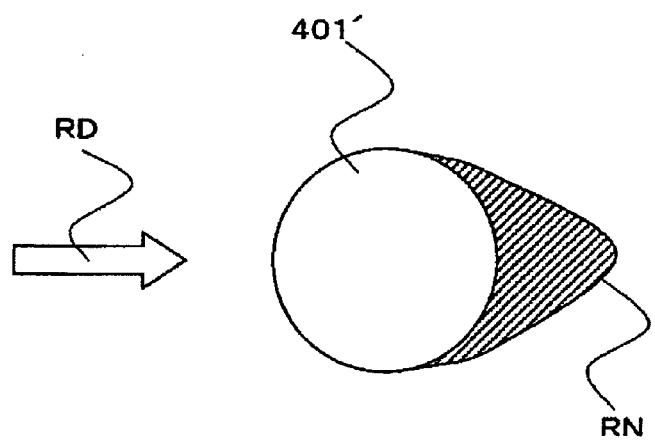
(b)
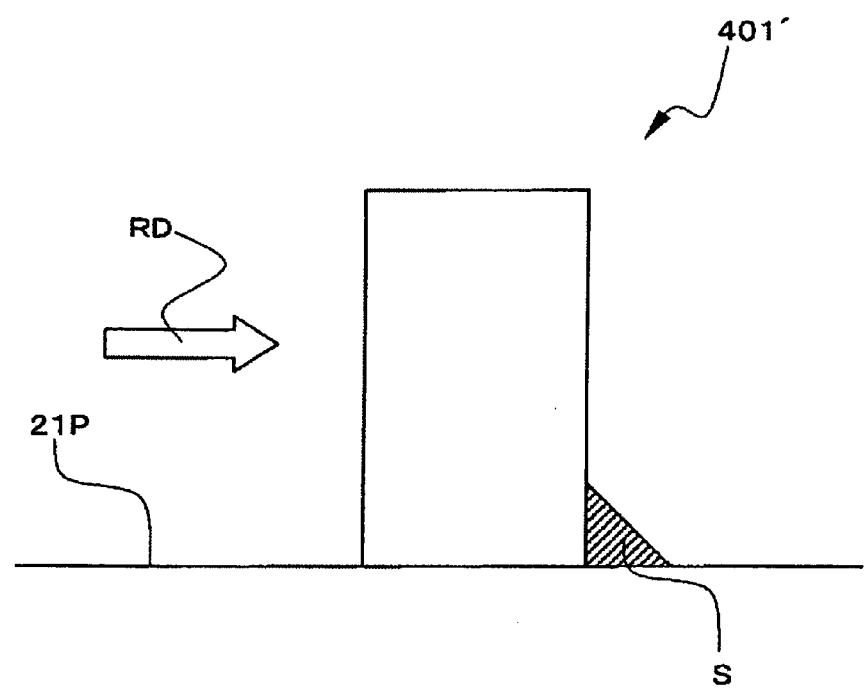

FIG. 8
(a)
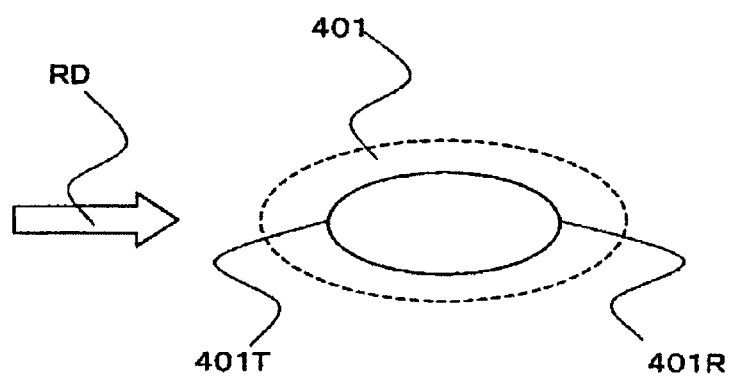
(b)
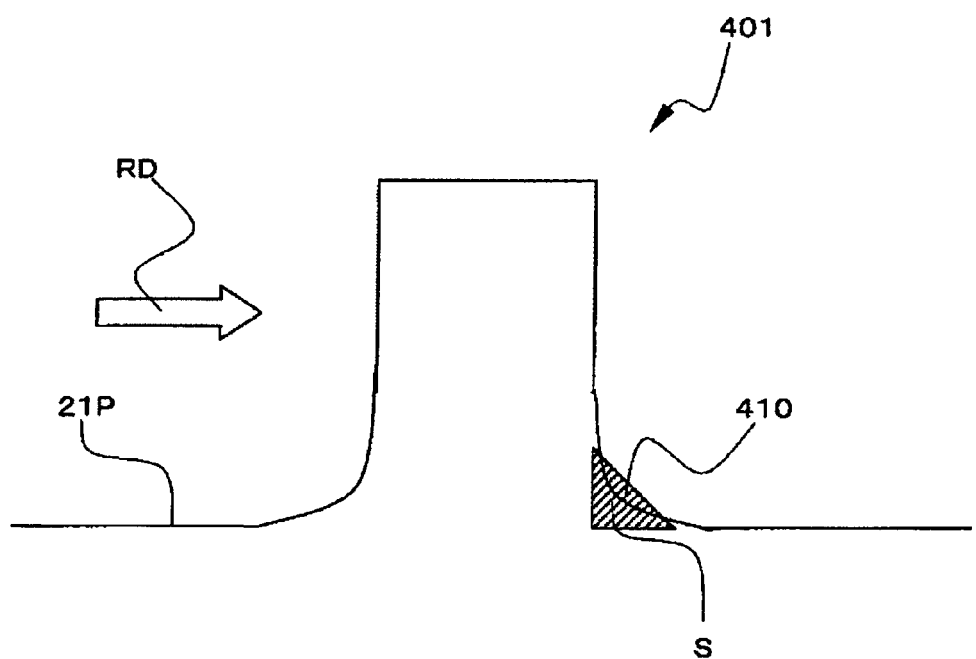

FIG. 10
(a)
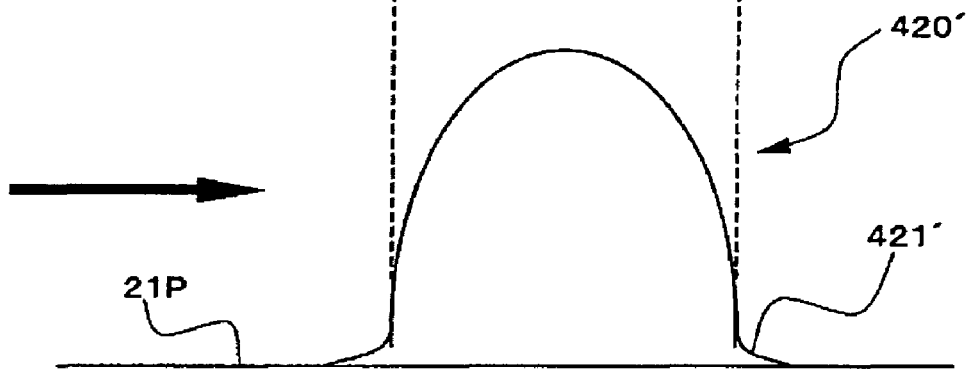
(b)

ELECTRO-OPTICAL DEVICE AND ELECTRONIC EQUIPMENT

BACKGROUND OF THE INVENTION

1. Field of Invention

The present invention relates to electro-optical devices and electronic equipment. Particularly, the invention relates to electro-optical devices which use pole-like spacers to maintain a predetermined gap between the two pieces of substrates and of electronic equipment provided with such electro-optical devices.

2. Description of Related Art

A related art electro-optical device, such as a liquid crystal device, can be constituted by sealing liquid crystals, which is an exemplary electro-optical substance, between two substrates on which are fabricated electrodes, wirings, elements, etc. In the electro-optical device of this kind, a so-called spacer is usually provided to maintain the gap between the two pieces of substrates, i.e., to maintain the thickness of the layer of liquid crystals (hereinafter "cell gap") constant (e.g., about 3 to 5 μm) over the whole surfaces of the substrates. The cell gap must be maintained constant. Otherwise, display characteristics are affected, such as transmission factor of light, contrast ratio, response speed, etc., and in bad cases, there may occur shading in the display.

More concretely, a spacer having a tiny spherical shape can be used, for instance. In the case of a direct viewing type (large type) liquid crystal display device, such as a liquid crystal TV or monitor, a number of such very small nearly spherical spacers are used which are homogeneously sprinkled in the liquid crystals between the two pieces of substrates. On the other hand, in the case of a small liquid crystal display device to display on an enlarged scale, for example, a light bulb of a projector, a spacer is used that is mixed in a sealing material that is used to adhere the two pieces of substrates together.

Another type of the spacer having a so-called pole shape (hereinafter "pole-like spacer") is also used. This is a spacer used in a form in which pole-like members that are made of a suitable organic material are erected on the substrate maintaining a suitable gap, and works to support two pieces of the substrates with a yield strength in the axial direction of the poles to maintain the cell gap therebetween constant. The "suitable gap" is provided such that, for example, there is a pole-like spacer in every several pixels to every several tens of pixels. Even when such pole-like spacers are used, it is generally accepted to use them in combination with the above nearly spherical spacer that is mixed in the sealing material (hereinafter, the spacer in the sealing material is particularly referred to as "gap material"). This makes it possible to more favorably satisfy the requirement of maintaining the cell gap constant over the whole surfaces of the substrates.

In maintaining the gap between the substrates "constant", the accuracy differs depending upon differences in the "twisted angle" of liquid crystal molecules, constituting the layer of liquid crystals, between the two pieces of substrates. In the case of the TN (twisted nematic) having the twisted angle of, for example, 90°, the accuracy of ±0.1 μm or less is required. In the case of the STN (super-twisted nematic) having the twisted angle of, for example, 260°, the accuracy of ±0.3 μm or less is required.

SUMMARY OF THE INVENTION

However, the above electro-optical device, and particularly the pole-like spacer, is subject to a problem as described below. Namely, in the liquid crystal device which is an electro-optical device, the surfaces of the two pieces of substrates facing each other, i.e., the surfaces facing the liquid crystals of the electro-optical substance, can be provided with orientation films which are rubbed in a predetermined direction to orient the liquid crystals in a predetermined direction. However, presence of the above pole-like spacers hinders the treatment of rubbing the orientation films, i.e., poorly oriented regions may occur.

This is due to the fact that the related art pole-like spacers have nearly a cylindrical shape. First, the above "orientation film" is made of a polyimide or the like, and formed on the pole-like spacers to orient the liquid crystal molecules in the liquid crystal layer in a predetermined manner. The "treatment of rubbing" includes, for example, a treatment of rubbing the surface of the orientation film in a predetermined direction with a buffing cloth after baking, wound on a rotary metal roller or the like (hereinafter, the "predetermined direction" referred to here is called "rubbing direction"). That is, in the treatment of rubbing the orientation film, the orientation film having protuberances due to the "height" of the pole-like spacers is rubbed with the buffing cloth along the rubbing direction. However, so-called shadow portions exist on the far side of the pole-like spacers if viewed along the rubbing direction. If the pole-like spacers have a nearly cylindrical shape, the fluff tips of the buffing cloth do not reach the shadow portions to a sufficient degree. This may become particularly conspicuous near the roots of the pole-like spacers on the side opposite to the side of the pole-like spacers facing the rubbing direction.

After all, the orientation film is not rubbed to a sufficient degree at the shadow portions or the root portions, permitting the formation of poorly oriented regions. Formation of the poorly oriented regions causes, for example, light to leak, deteriorating the quality of image.

In order to address this problem, the related art covers the poorly oriented regions with a light-shielding film. According to this method, the poorly oriented regions contribute little to displaying the image, and hence reduces the possibility of the light leak. With this method, however, regions that should have contributed to the display are now covered with the light-shielding film, thus causing a reduction in the numerical aperture, which is not desirable.

This invention addresses the above and/or other problems, and provides an electro-optical device capable of displaying an image of high quality reducing or inhibiting the occurrence of poor orientation caused by the presence of the pole-like spacers, and of accomplishing a high numerical aperture, as well as an electronic equipment provided with the electro-optical device.

A first exemplary electro-optical device of the invention includes a pair of substrates holding an electro-optical substance, and pole-like spacers provided on at least one of the pair of substrates on a to-be-provided surface facing the electro-optical substance, and the pole-like spacers have a slope portion with a surface connected to the to-be-provided surface at the roots thereof.

According to the first electro-optical device of the invention, first, a gap sandwiched by a pair of substrates is maintained to be of a predetermined thickness. Into the gap can be introduced an electro-optical substance, such as liquid crystals (hereinafter "liquid crystals") from the outer side of the gap through an injection port separately formed in the periphery of the pair of substrates. This desirably makes it possible, in almost the entire surface of the substrate, to maintain constant the thickness of the liquid crystal layer in the gap, i.e., the cell gap, and hence to favorably maintain display characteristics, such as light transmission factor, contrast ratio, response speed and the like.

In this invention, in particular, a slope portion is formed at the root of the pole-like spacer, the slope portion having a surface connecting to the to-be-provided surface. Desirably, the surface of the slope portion is smoothly connected to the to-be-provided surface. Due to the slope portion, the pole-like spacer mildly rises from the to-be-provided surface instead of sharply rising on the to-be-provided surface.

If geometrically speaking, the slope portion has such a feature that a first acute angle, subtended by the to-be-provided surface and a first tangential line in contact with one point on the inner peripheral surface thereof, is smaller than a second acute angle, subtended by the to-be-provided surface and a second tangential line in contact with another point on the inner peripheral surface thereof at a position farther than the above one point, as viewed from the to-be-provided surface.

When the orientation film is to be provided on the to-be-provided surface and is to be rubbed in the electro-optical device of this invention, the slope portion makes it possible to reduce or avoid the formation of poorly oriented regions as much as possible in the treatment of rubbing. This is because the pole-like spacers according to the invention are provided with a slope portion at their roots, thus enabling the fluff tips of a buffing cloth used in the treatment of rubbing to reach even the "shadow portions" described above, i.e., to reach even the portions where the pole-like spacers are connected to the to-be-provided surface with a sufficient degree.

As described above, according to the invention, it is possible to provide an electro-optical device with an orientation film without almost no poorly oriented region, thus making it possible to display images of high quality without leakage of light. Further, according to the invention, there is no need to provide such a light-shielding film, which, so far, had been formed so as to cover poorly oriented portions. In other words, the areas of the light-shielding film required by the invention can be decreased as compared to the related art one, since there is no need to cover such regions. Therefore, the electro-optical device according to the invention makes it possible to accomplish a higher numerical aperture.

The "pole-like spacers" referred to in the present invention can concretely assume various shapes inclusive of the slope portion which is the feature described above. Whatever shape may be basically assumed, the invention is confined within the scope thereof. In addition to assuming the shapes described in the exemplary embodiments of the invention appearing later, the pole-like spacers can assume a shape resembling a long silk hat in cross-section along the axial direction of the pole-like spacers and the slope portion, and a pyramidal shape in cross-section.

Further, as is understood from the foregoing description, the "slope portion" referred to in the invention may be formed in at least a portion corresponding to the above "shadow portion". In other words, the slope portion may be formed in a portion of the outer periphery of the pole-like spacer. Even this exemplary embodiment makes it possible to effect the rubbing to a sufficient degree for the "shadow portions" where it is considered that the defective orientation may occur. Accordingly, the above-mentioned advantage can similarly be obtained.

The first electro-optical device according to an exemplary embodiment of the invention further includes an orientation film formed on the to-be-provided surface, the pole-like spacers having an elliptic shape in cross-section on a plane in parallel with the to-be-provided surface, and a long diameter of the elliptic shape extending in a direction in agreement with a direction in which the orientation film is rubbed.

According to this exemplary embodiment, the buffing cloth advances along the rubbing direction, and the fluff tips of the buffing cloth move as described below. That is, first, the fluff tips of the buffing cloth come in contact with the head end portion of an elliptic shape, and are divided maintaining a small distance to go along both side surfaces of the pole-like spacer. Then, as the buffing cloth proceeds, the dividing distance gradually increases. When the buffing cloth reaches the short-diameter portion of the elliptic shape, the distance becomes the greatest between the fluff tips located on both side surfaces of the pole-like spacer. Thereafter, the distance decreases as the buffing cloth proceeds, and finally, the fluff tips meet again when they have arrived at the rear end portion of the elliptic shape. According to this exemplary embodiment as described above, the fluff tips smoothly move and are allowed to reach even the "shadow portions" of the pole-like spacers, to a sufficient degree.

According to this exemplary embodiment, the probability of poor orientation can be further decreased, compounded by the advantage of the above slope portion.

A related art technology according to which the sectional shape of the pole-like spacer has an "acute angle" is disclosed in JP-A-2001-305552. In the exemplary embodiment of this invention, however, the sectional shape of the pole-like spacers is not having an "acute angle". That is, in this exemplary embodiment, the portion where the buffing cloth comes in contact with the pole-like spacers, or the portion where the buffing cloth is separated away from the pole-like spacers, is a round head end of an "elliptic shape". Therefore, this exemplary embodiment realizes a soft "contact" between the pole-like spacers and the buffing cloth, compared when the above portion has an acute angle, making it possible to effect the rubbing more smoothly.

From the foregoing description, it is usually desired that the ratio of (short diameter)/(long diameter) of the elliptic shape is better to be smaller. This decreases the "shadow portions". However, the pole-like spacers must exhibit its own function as spacers, which are to maintain the cell gap constant as described above. It is not therefore desired that the pole-like spacers are formed in a shape, which is too slim without capable of producing an yield strength to a sufficient degree in the axial direction. A desired shape of the pole-like spacers can be determined by taking the above-mentioned circumstances into consideration. Concretely speaking, the shape of the pole-like spacers can be suitably determined empirically, experimentally, theoretically or by simulation.

A second exemplary electro-optical device of the invention includes a pair of substrates holding an electro-optical substance, pole-like spacers provided on at least one of the pair of substrates on a to-be-provided surface facing the electro-optical substance, and an orientation film formed on the to-be-provided surface, the pole-like spacers having an elliptic shape in cross-section in a direction in parallel with said to-be-provided surface, and a long diameter of the elliptic shape extending in a direction in agreement with the direction in which the orientation film is rubbed.

According to the second electro-optical device of this invention, the pole-like spacers have an elliptic shape in cross-section nearly like the exemplary embodiment of the first electro-optical device of the invention described above. Therefore, this invention produces an advantage nearly the same as the one described above.

According to another exemplary embodiment of the first electro-optical device of the invention, the slope portion is formed on the entire outer circumference of the pole-like spacers.

According to this exemplary embodiment, the slope portion is formed on the whole outer circumference of the pole-like spacers, enabling the fluff tips of the buffing cloth to evenly reach every portion at the roots of the pole-like spacers. Therefore, the probability of poor orientation can further be decreased than the one described above.

According to another exemplary embodiment of the first or second electro-optical device of the invention, the pole-like spacers have a maximum area of the sectional shape, on a plane in parallel with the to-be-provided surface and in contact with the to-be-provided surface, and the area decreasing as it departs from the to-be-provided surface.

According to this exemplary embodiment, the pole-like spacers have a three-dimensional taper shape from the root thereof toward the head end thereof. This enables the buffing cloth to proceed more smoothly and the fluff tips of the buffing cloth to move more smoothly. Therefore, this exemplary embodiment further decreases the probability of causing defective orientation.

According to another exemplary embodiment of the first or second electro-optical device of the invention, the pole-like spacer has a semi-spherical shape or a semi-elliptic spherical shape.

According to this exemplary embodiment, the buffing cloth proceeds more smoothly and the fluff tips of the buffing cloth move more smoothly, further decreasing the probability of causing defective orientation. The "semi-elliptic spherical shape" in this exemplary embodiment, is typically a three-dimensional shape of when, for example, a rugby ball is cut along a plane of a maximum sectional area. The concept of "semi-elliptic spherical shape" or the above "semi-spherical shape" stands for a "semi-elliptic shape" or a "semi-sphere" in a geometrically strict sense, and further encompasses slightly modified shapes based thereupon.

According to another exemplary embodiment of the first or the second electro-optical device of the invention, the head end of the pole-like spacers includes a flat surface.

According to this exemplary embodiment, the function as a spacer is exhibited more efficiently. Because the head end of the pole-like spacers includes a flat surface, the portion of the pole-like spacers provided on one substrate and is in contact with the surface of the other substrate serves as a flat surface. This makes it possible to more favorably satisfy the requirement of maintaining the cell gap constant between the pair of substrates.

Another exemplary embodiment of the first or second electro-optical device of the invention includes: a first striped wiring formed on the at least one substrate; a second striped wiring, formed on the at least one substrate or the other substrate, and extending in a direction that intersects the first striped wiring; switching elements and pixel electrodes formed corresponding to the regions where the second striped wiring and the first striped wiring intersect each other; and a light-shielding film formed on the at least one substrate or the other substrate at position corresponding to positions where the first striped wiring and the second striped wiring are formed, and the pole-like spacers being arranged within a width of the light-shielding film.

According to this exemplary embodiment, a so-called active matrix drive can be accomplished by utilizing the switching elements. Concretely speaking, in an exemplary embodiment having a data line which is an example of first striped wiring, a scanning line which is an example of second striped wiring, a thin-film transistor (TFT) which is an example of switching element and a pixel electrode formed on the at least one substrate, the TFT is controlled to be turned ON/OFF via the scanning line, thereby to control the application of image signals to the pixel electrode from the data line. When a counter electrode is formed on the other substrate, then, a predetermined potential difference can be established between the counter electrode and the pixel electrode, and a predetermined electric field can be applied to the liquid crystals. According to a another exemplary embodiment, a scanning line (or a data line) which is an example of the first striped wiring is formed on the first substrate, and a data line (or a scanning line) which is an example of the second striped wiring, a thin-film diode (TFD) which is an example of switching element, and a pixel electrode are formed on the other substrate. Because this configuration allows to produce a predetermined potential difference between the data line (or the scanning line) and the pixel electrode, it is possible to apply a predetermined electric field to the liquid crystals.

In this exemplary embodiment, in particular, a light-shielding film is further formed on either the at least one substrate or the other substrate at a position corresponding to a position where the first striped wiring and the second striped wiring are formed, and the pole-like spacers being arranged within the width of the light-shielding film. This is a favorable arrangement since the pole-like spacers are arranged in a region, which does not contribute to displaying the image and does not interrupt the transmission of light through the liquid crystals. Besides, as described above, the pole-like spacers of this invention reduce or minimize the region of poor orientation on the orientation film. In this exemplary embodiment, therefore, the area of the "light-shielding film" can be decreased. Therefore, this exemplary embodiment provides an electro-optical device of the active matrix drive type featuring a high numerical aperture.

Another exemplary embodiment of the first or second electro-optical device of the invention includes a first striped electrode formed on the at least one substrate, a second striped electrode formed on the other substrate, and extending in a direction that intersects the first striped electrode, and a light-shielding film formed on either of the at least one substrate or the other substrate except a region where the first striped electrode and the second striped electrode intersect each other.

According to this exemplary embodiment, a so-called passive matrix drive can be accomplished. Namely, in this exemplary embodiment, a predetermined potential difference can be formed between the first striped electrode and the second striped electrode in a region where they intersect each other, and a predetermined electric field can be applied to the liquid crystals.

Also in this exemplary embodiment, the light-shielding film is formed on either the at least one substrate or the other substrate, except a region where the first striped electrode and the second striped electrode intersect each other, like in the above electro-optical device of the active matrix drive type, and the pole-like spacers are arranged within the width of the light-shielding film. This is a favorable arrangement since the pole-like spacers are arranged in a region, which does not contribute to displaying the image and does not interrupt the transmission of light through the liquid crystals. Besides, as described above, the pole-like spacers of this invention reduce or minimize the regions of poor orientation on the orientation film. In this exemplary embodiment, therefore, the area of the "light-shielding film" can be decreased. Therefore, this exemplary embodiment provides an electro-optical device of the passive matrix drive type featuring a high numerical aperture.

An electronic equipment of the invention is equipped with the above first or second electro-optical device (inclusive of various exemplary embodiments thereof) of the invention.

The electronic equipment of this invention is equipped with the above first or second electro-optical device of the invention, and is hence provided with the orientation film having least poorly oriented regions. It is therefore allowed to realize various kinds of electronic equipment capable of displaying images of high quality without leaking light, such as projection-type display devices (liquid crystal projectors), liquid crystal TVs, cell phones, electronic organizer, word processors, view finder-type or monitor-type video tape recorders, work stations, TV telephones, POS terminals, touch panels and the like, for example.

The above and other advantages of the invention will become obvious from the exemplary embodiments described below.

BRIEF DESCRIPTION OF THE DRAWINGS

FIGS. 7(a) and 7(b) are schematics illustrating the poorly oriented regions that are formed when an orientation film (not shown), formed on the related art pole-like spacers, is subjected to the rubbing treatment, where FIG. 7(a) is a plan view thereof, and FIG. 7(b) is a sectional view thereof;

FIGS. 8(a) and 8(b) are schematics illustrating that the poorly oriented regions are remarkably decreased when the orientation film (not shown), formed on the pole-like spacers of the first exemplary embodiment, is subjected to the rubbing treatment, where FIG. 8(a) is a plan view thereof, and FIG. 8(b) is a sectional view thereof;

FIGS. 10(a) and 10(b) are schematics illustrating the overall shape of a pole-like spacer according to an exemplary modification of the second exemplary embodiment, where FIG. 10(a) is a plan view thereof, and FIG. 10(b) is a sectional view thereof;

DETAILED DESCRIPTION OF PREFERRED EMBODIMENTS

First Exemplary Embodiment

A first exemplary embodiment of the invention is described below with reference to the drawings. In the following first exemplary embodiment, the electro-optical device of the invention is applied to the liquid crystal device.

(General Constitution of the Electro-Optical Device)

Figure 1:
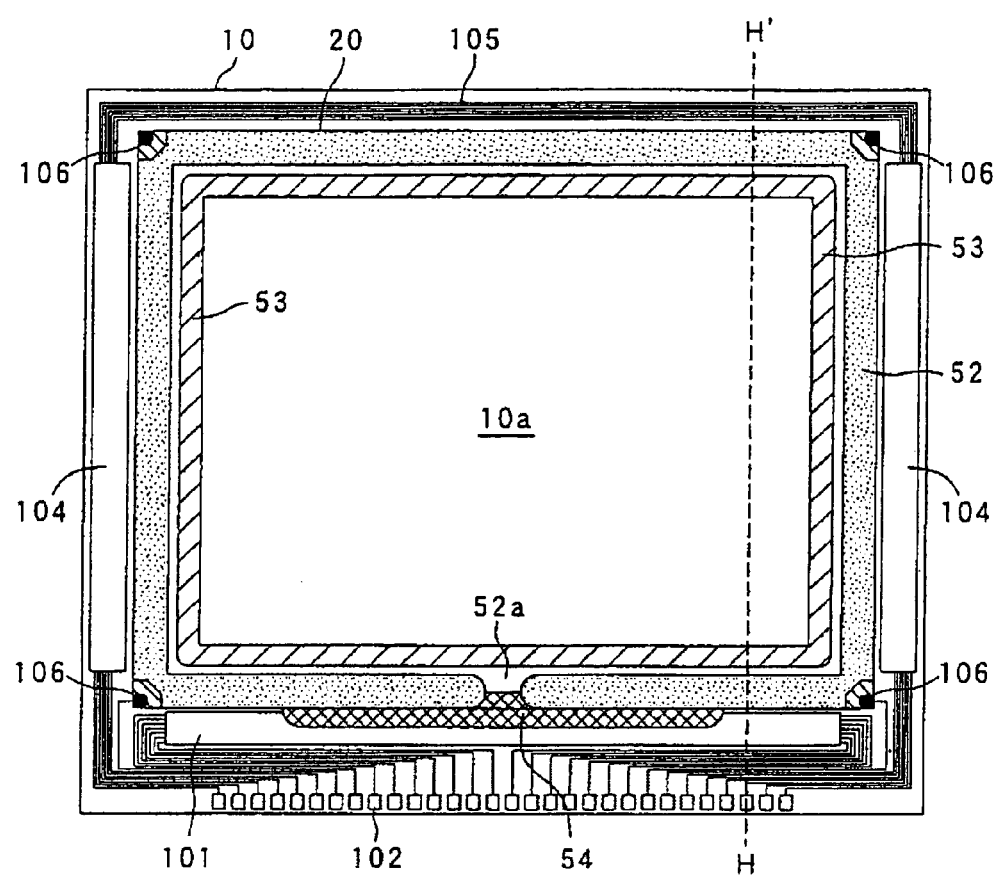
FIG. 1 is a plan view of a TFT array substrate, together with various constituent elements formed thereon, in the electro-optical device according to a first exemplary embodiment of the invention, as viewed from the side of a counter substrate.

First, the general constitution of the electro-optical device according to the first exemplary embodiment of the invention is described below with reference to FIGS. 1 and 2. FIG. 1 is a plan view of a TFT array substrate, together with the constituent elements that are formed thereon, as viewed from the side of the counter substrate 20, and FIG. 2 is a sectional view taken along plane H–H' in FIG. 2.

Figure 2:
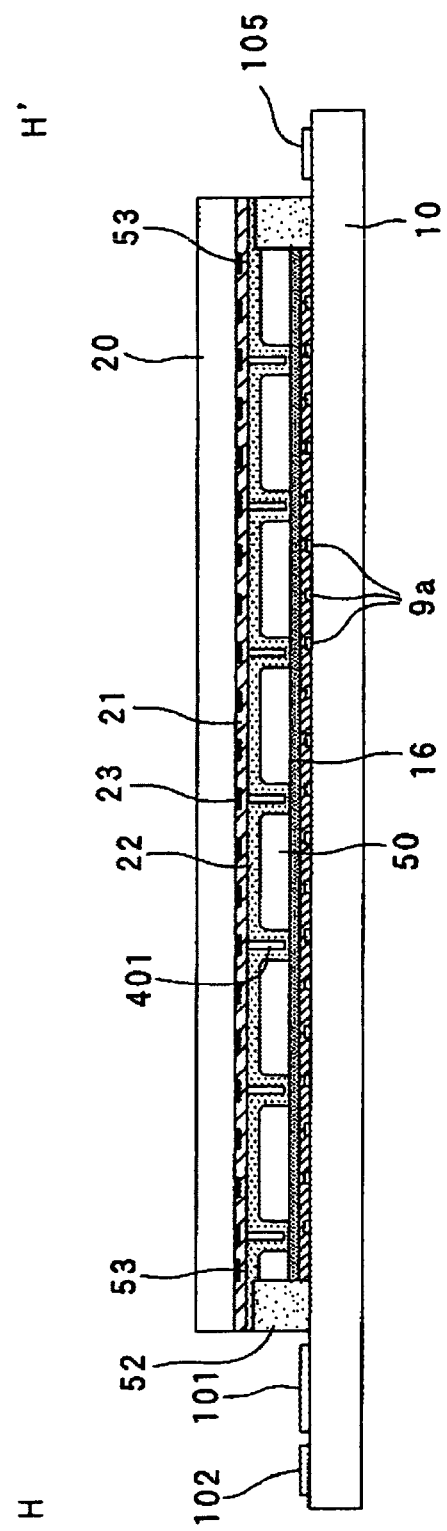
FIG. 2 is a sectional view taken along plane H–H' in FIG. 1.

In the electro-optical device according to the first exemplary embodiment shown in FIGS. 1 and 2, the TFT array substrate 10 and the counter substrate 20 are arranged being opposed to each other. A liquid crystal layer 50 is sealed between the TFT array substrate 10 and the counter substrate 20, the TFT array substrate 10 and the counter substrate 20 being adhered to each other with a sealing material 52 provided on a sealing region surrounding an image display region 10a.

The liquid crystal layer 50 includes, for example, one kind of nematic liquid crystals or a mixture of several kinds of nematic liquid crystals, which assume a predetermined state of orientation between a pair of orientation films that are described below.

As shown in FIG. 1, the sealing material 52 is provided in a square shape as viewed on a plane so as to surround the image display region 10a. As shown in a lower part of FIG. 1, a liquid crystal injection port 52a is provided in a portion of the sealing member 52 to inject liquid crystals into a gap between the TFT array substrate 10 and the counter substrate 20. In the electro-optical device that is completed, the liquid crystal injection port 52a is provided with a sealing material 54 of, for example, an ultraviolet ray curable acrylic resin, so that the liquid crystals introduced into the gap will not leak to the outer side.

As the material constituting the sealing material 52, there can be used an ultraviolet ray curable resin, thermosetting resin and the like resin, or example. In sticking the TFT array substrate 10 and the counter substrate 20 together, the two substrates 10 and 20 are adhered together with the application of a suitable pressure. The sealing material is cured by the irradiation with an ultraviolet ray when it is made of the ultraviolet ray curable resin, or is cured by heating when it is made of the thermosetting resin.

The sealing material 52 contains a gap material (not shown) which is a spacer to maintain the constant gap between the two substrates 10 and 20, i.e., to maintain the cell gap constant. The gap material may be, for example, a glass fiber or glass beads having, generally, a nearly spherical shape.

In FIG. 2, further, an orientation film 16 is formed on the pixel electrodes 9a after the TFTs for switching the pixels, and wirings for scanning lines and data lines have been formed on the TFT array substrate 10. On the counter substrate 20, on the other hand, there are formed an counter electrode 21 made of a transparent material such as ITO (indium-tin oxide) as well as a light-shielding film 23 to define the light-shielding region, and an orientation film 22 on the uppermost layer thereof.

In the first exemplary embodiment, in particular, in order to maintain the cell gap constant between the TFT array substrate 10 and the counter substrate 20, there are provided, as shown in FIG. 2, pole-like spacers 401 of nearly an elliptic polar shape on the counter electrode 21 (lower side in the drawing) on the side of the counter substrate 20 and on the light-shielding film 23, and under the orientation film 22 (upper side in the drawing), in addition to providing the gap material. The pole-like spacers 401 are made of, for example, an acrylic resin or a polyimide.

Figure 3:
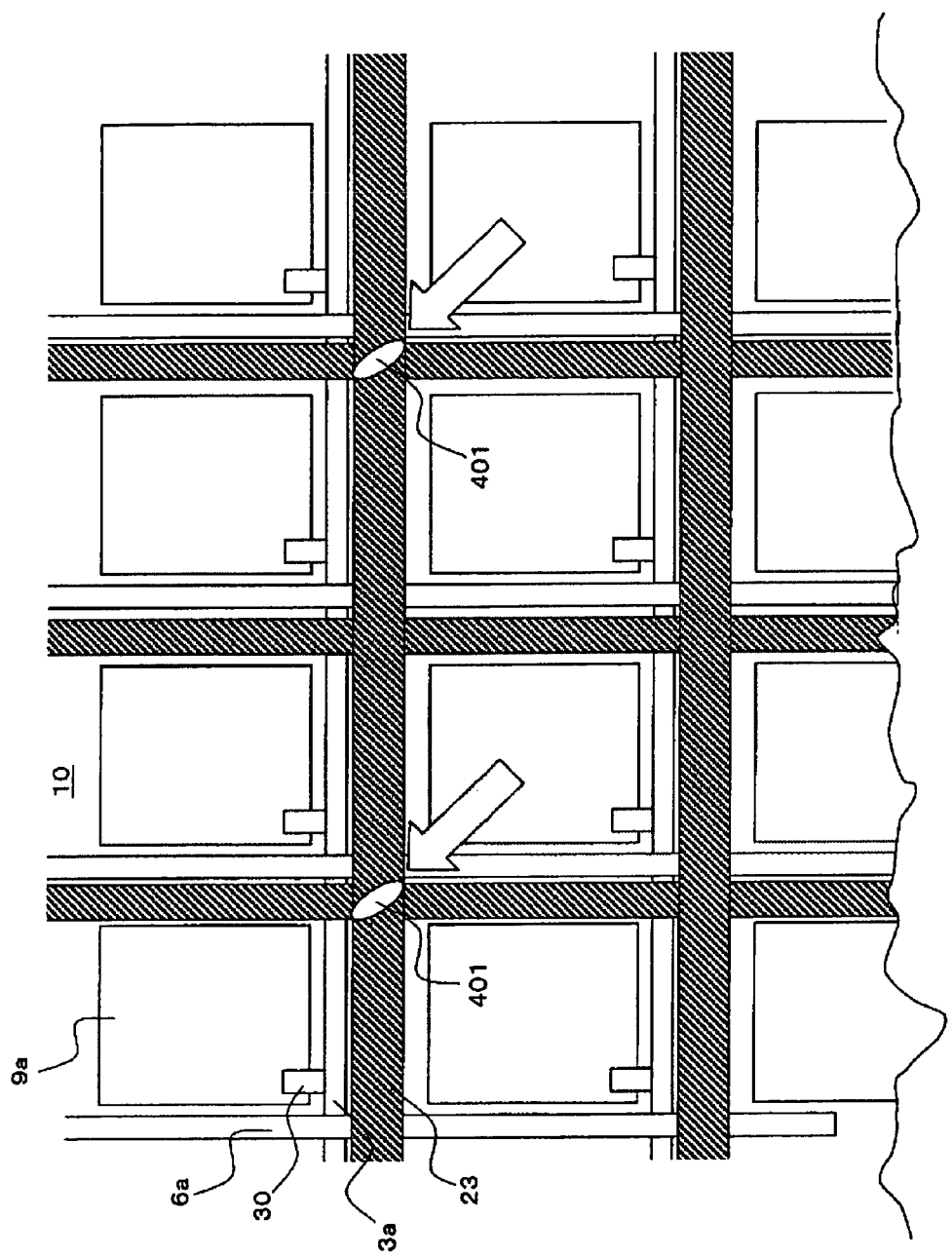
FIG. 3 is a plan view illustrating the arrangement of pole-like spacers on the counter substrate according to the first exemplary embodiment.
Figure 4:
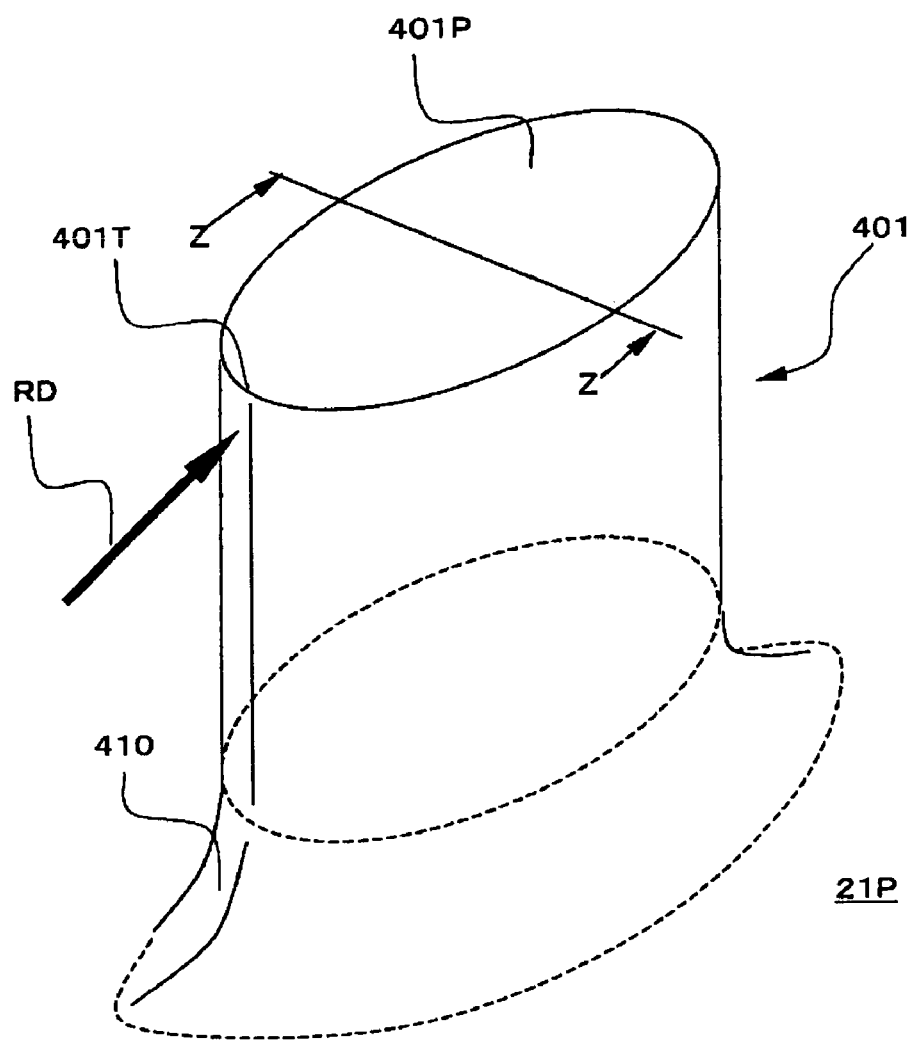
FIG. 4 is a perspective view illustrating the overall shape of a pole-like spacer.

The pole-like spacers 401 according to the first exemplary embodiment are described below in further detail with reference to FIGS. 3 to 5. FIG. 3 is a plan view illustrating the arrangement of the pole-like spacers 401 on the counter substrate 20 according to the first exemplary embodiment. FIG. 3 further illustrates the light-shielding film 23 and the pole-like spacers 401 formed on the counter substrate 20 in combination with the pixel electrodes 9a formed on the TFT array substrate 10, so that the arrangement of the pole-like spacers 401 can be easily comprehended. FIG. 4 is a perspective view illustrating the entire shape of a pole-like spacer 401, and FIG. 5 is a sectional view taken along plane Z–Z' in FIG. 4.

First, the pole-like spacers 401 are arranged on the counter substrate 20 as shown in FIG. 3. In FIG. 3, on the TFT array substrate 10 are formed scanning lines 3a, data lines 6a extending in a direction to intersect therewith, TFTs 30 formed in the regions where the scanning lines 3a and the data lines 6a intersect each other, and pixel electrodes 9a (these elements will be referred to again later in the "circuit constitution and operation of the electro-optical device"). FIG. 3 further illustrates the light-shielding film 23 formed on the counter substrate 20. The light-shielding film 23 on the counter substrate 20 is arranged so as to correspond to the positions where the scanning lines 3a and the data lines 6a are formed on the TFT array substrate 10, or so as to run along the gaps among the pixel electrodes 9a, and defines the light-shielding regions in the form of a lattice. The electro-optical device of the first exemplary embodiment is further provided with a frame light-shielding film 53 (see FIG. 1) defining the outermost periphery of the image display region 10a. These light-shielding film 23 and the frame light-shielding film 53 work to reduce or prevent light from being mixed among the pixel electrodes 9a, and reduce or prevent the contrast of image from dropping. As the material to form the light-shielding film 23, there can be used a resin black obtained by dispersing metal chrome, carbon or titanium in a photo resist, or a metal material such as nickel or the like, for example. Alternatively, there can be further used the one having a laminated layer structure of two or more materials including the above components.

Referring to FIG. 3, the pole-like spacers 401 are arranged in a plural number at suitable places on the light-shielding film 23 and on the counter electrodes 21 so as to be confined within the width of the light-shielding film 23. Here, "suitable places" have such a meaning that the pole-like spacers 401 are arranged at a uniform density on the substrate surface, or that the liquid crystals are smoothly injected into the gap between the TFT array substrate 10 and the counter substrate 20 through the liquid crystal injection port 52a. In the first exemplary embodiment as shown in FIG. 3, the pole-like spacer 401 is provided for every four pixel electrodes 9a, enabling the "liquid crystals to be injected" smoothly.

Figure 5:
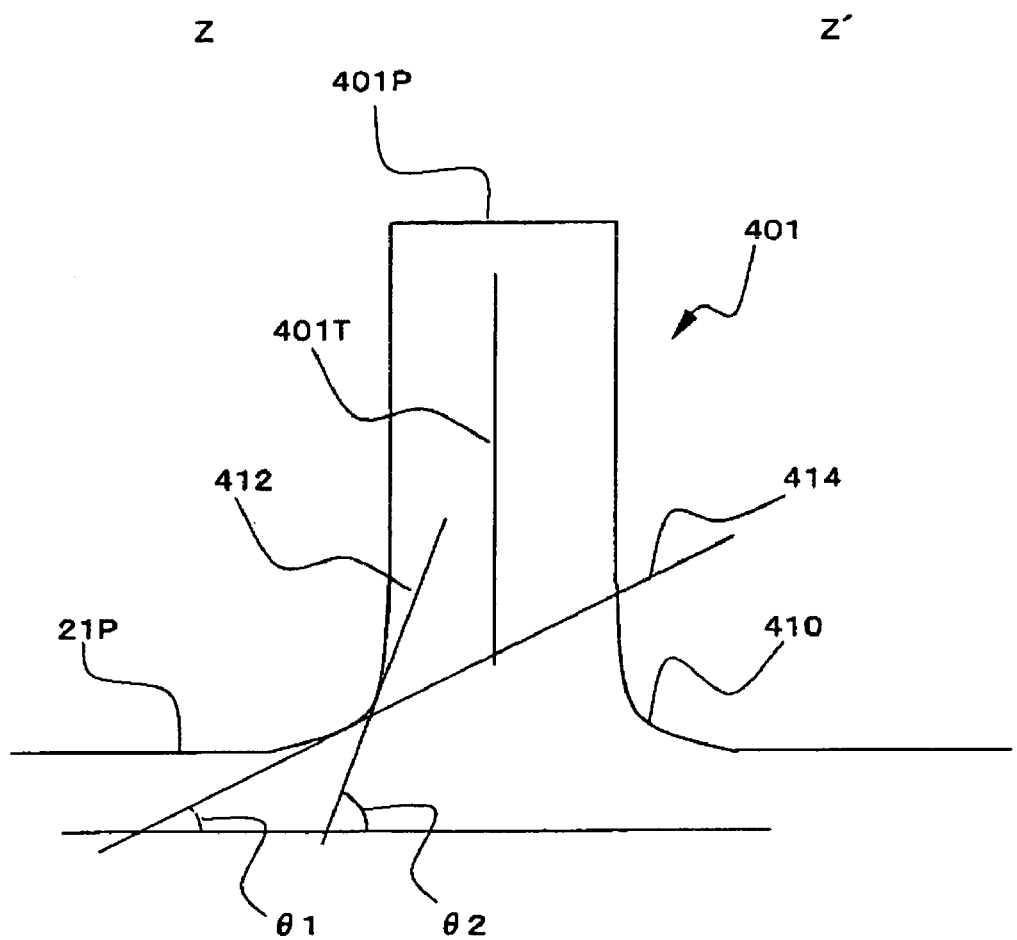
FIG. 5 is a sectional view taken along plane Z–Z' in FIG. 4.

As shown in FIGS. 4 and 5, on the other hand, each pole-like spacer 401 that is thus arranged has a nearly elliptic pole shape including a flat surface 401P at an head end thereof. That is, the pole-like spacer 401 on the counter electrode 23 has an elliptic shape in cross-section on a plane in parallel with the surface on where the pole-like spacer 401 is provided (hereinafter referred to as "to-be-provided surface 21P", see FIGS. 4 or 5). In particular, the pole-like spacer 401 of such a shape has the flat surface 401P at the head end thereof, offering enhanced adhesion to a portion that comes in contact with the orientation film 16 on the TFT array substrate 10, and more favorably satisfying the requirement of maintaining the cell gap constant.

At the root of the pole-like spacer 401, a slope portion 410 is formed having a surface connecting smoothly to the to-be-provided surface 21P, as shown well in FIG. 4. As concretely illustrated in FIG. 5, the word "smoothly" stands for that a first acute angle $\theta 1$, subtended by the to-be-provided surface 21P and a first tangential line 414 in contact with one point on the inner peripheral surface of the slope portion 410, is smaller than a second acute angle $\theta 2$, subtended by the to-be-provided surface 21P and a second tangential line 412 in contact with another point on the inner peripheral surface at a position farther than the above one point as viewed from the to-be-provided surface 21P ($\theta 1 < \theta 2$). In the first exemplary embodiment, the slope portion 410 is provided along the whole outer circumference of the pole-like spacer 401.

The above shape is formed by, for example, a method in which a film of the above material is once formed on the counter electrodes 21, and the film is etched or patterned based on a photolithography technology. In this case, the pole-like spacers 401 are not only formed in the above-mentioned shape, but also are freely arranged relying upon the processing to expose the resist film formed on the above film to light (patterning processing).

In the pole-like spacer 401 in the first exemplary embodiment, the long diameter of the elliptic shape in cross-section extends in a direction in agreement with a direction of rubbing treatment (rubbing direction) RD for the orientation film 22 on the counter substrate 20. In FIG. 3, the rubbing direction RD has been set heading toward the left upper corner from the right lower corner in the drawing, and the pole-like spacers 401 are so arranged as to be inclined in FIG. 3 to meet the rubbing direction RD. In FIG. 4, the pole-like spacers 401 are so arranged that the head end portion 401T of the pole-like spacers faces the rubbing direction RD.

In FIGS. 1 and 2, in addition to the above constitution, there are arranged a data line drive circuit 101 to drive the data lines 6a by feeding image signals to the data lines 6a at predetermined timings, and external circuit connection terminals 102 along a side of the TFT array substrate 10, as described below. There are further arranged scanning line drive circuits 104 to drive the scanning lines 3a by feeding scanning signals to the scanning lines 3a at predetermined timings along the two sides neighboring the above one side, as described below.

If a delay of scanning signals fed to the scanning lines 3a does not cause a problem, then the scanning line drive circuit 104 may be provided on one side only. Further, the data line drive circuits 101 may be arranged on both sides along the sides of the image display region 10a. A plurality of wirings 105 are provided along the remaining side of the TFT array substrate 10 to connect together the scanning line drive circuits 104 provided on both sides of the image display region 10a. Further, an electrically conducting material 106 is provided on at least one of the corners of the counter substrate 20 to make an electric connection between the TFT array substrate 10 and the counter substrate 20.

In addition to the data line drive circuit 101 and the scanning line drive circuits 104 and the like, there may be further formed, on the TFT array substrate 101, a sampling circuit to apply image signals to the plurality of data lines 6a at predetermined timings, a precharging circuit to feed precharging signals of a predetermined voltage level to the plurality of data lines 6a prior to feeding image signals, and a checking circuit to check the quality and defect of the electro-optical device during the production or at the time of shipping.

The electro-optical device of the first exemplary embodiment having the above constitution exhibits advantages as described below owing to the characteristic shape or arrangement of the pole-like spacers 401 described above.

That is, due to the slope portion 410 formed at the root, the pole-like spacers 401 enable the orientation film 22 to be favorably rubbed as described below.

Figure 6:
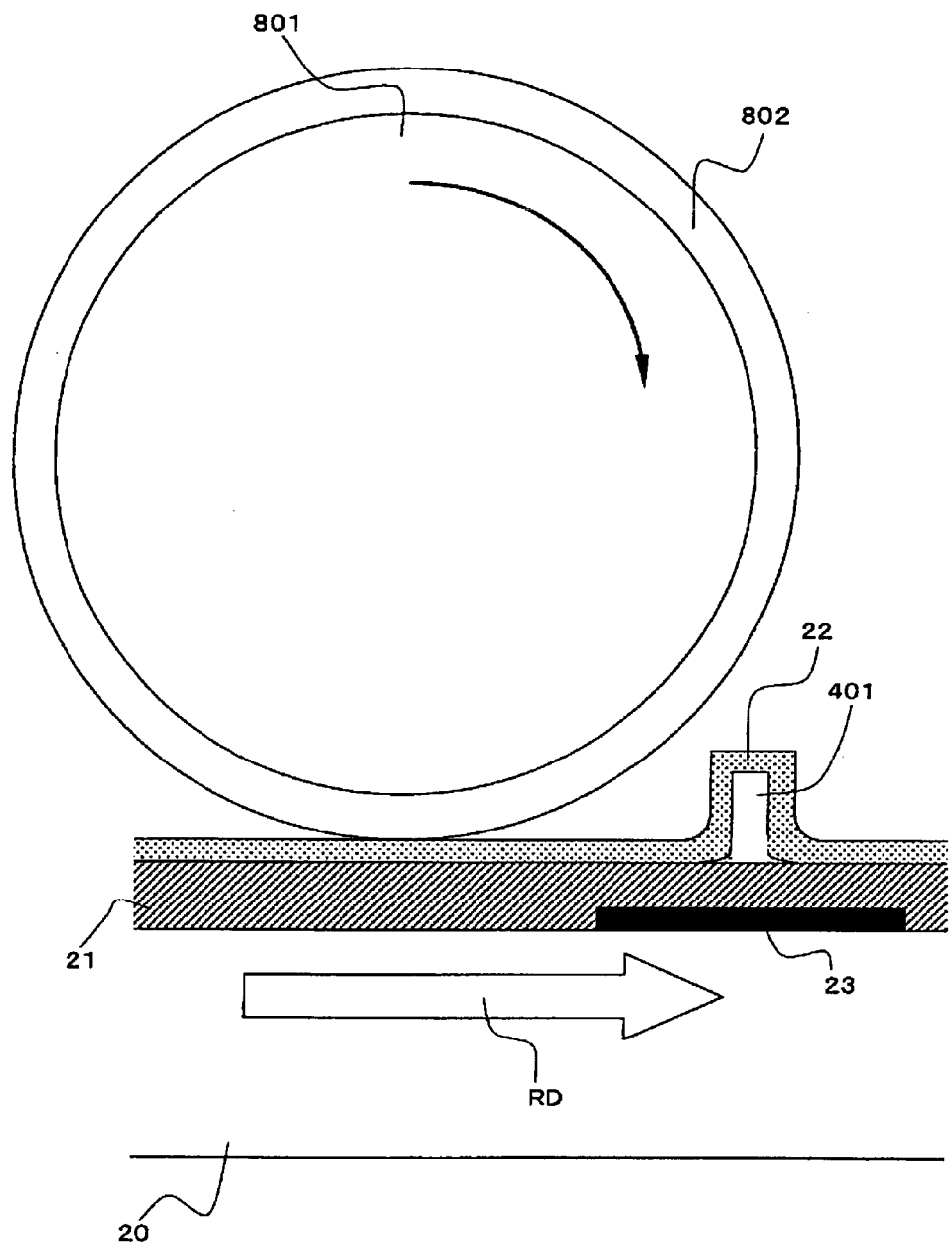
FIG. 6 is a schematic illustrating a rubbing treatment.

At first, the "rubbing treatment" stands for a treatment in which, as schematically illustrated in, for example, FIG. 6, the surface of the orientation film 22 after the baking is rubbed in a predetermined direction with a buffing cloth 802, wound on a rotary metal roller 801. In FIG. 6, the rotary metal roller 801 rotates in the direction of an arrow as shown in the drawing, and a relative movement takes place between the rotary metal roller 801 and the orientation film 22. Accordingly, the main polymer chains of polyimide constituting the orientation film 22 are stretched along the rubbing direction RD as shown in FIG. 6 or in FIGS. 3 to 5, and the liquid crystal molecules in the liquid crystal layer 50 on the orientation film 22 are oriented in a predetermined direction.

When the rubbing treatment was effected, so far, the poorly oriented regions RN were formed as shown in FIGS. 7(a) and 7(b). FIGS. 7(a) and 7(b) are schematics illustrating the occurrence of poorly oriented regions RN when the orientation film (not shown) formed on the conventional pole-like spacers 401' is rubbed, where FIG. 7(a) is a plan view thereof and FIG. 7(b) is a sectional view thereof. The poorly oriented regions RN were so far formed due to the presence of the pole-like spacers 401' of nearly a cylindrical shape sharply rising on the orientation film 22, i.e., the fluff tips of the buffing cloth 802 were not allowed to reach the portions S shadowed by the pole-like spacers 401' to a sufficient degree.

However, with the pole-like spacers 401 according to the first exemplary embodiment, on the other hand, the slope portions 410 formed at the roots thereof permit the fluff tips of the buffing cloth 802 to reach the portions where the pole-like spacers 401 are connected to the to-be-provided surface 21P, and to reach the portions S shadowed by the pole-like spacers 401 to a sufficient degree. This is because, as will be understood from FIGS. 8(a) and 8(b) which has the same purport as that of FIGS. 7(a) and 7(b), nearly the whole shadowed portions S are replaced by the slope portions 410. In the first exemplary embodiment, for instance, since the slope portion 410 is formed along the whole outer circumference of the pole-like spacers 401, and the advantage is obtained along the whole outer circumference.

As described above, the pole-like spacers 401 according to the first exemplary embodiment make it possible to greatly decrease the areas of the poorly oriented regions RN, compared to the conventional art, in rubbing the orientation film 22.

In addition, the pole-like spacers 401 according to the first exemplary embodiment have an elliptic shape in cross-section on a plane in parallel with the to-be-provided surface 21P, and the long diameter of the elliptic shape is extending in a direction in agreement with the rubbing direction RD (see FIG. 3), thus contributing greatly to decrease the poorly oriented region. Namely, in this case, the fluff tips of the buffing cloth 802 move along the rubbing direction Rd to, first, come in contact with the head end portion 410T of the elliptic shape, then, divided while maintaining a small distance so as to go along both side surfaces of the pole-like spacers 401. The distance of division gradually increases as the buffing cloth 802 proceeds, and the distance between the fluff tips on both side surfaces of the pole-like spacers 401 becomes a maximum when the buffing cloth 802 has arrived at the short diameter portion of the elliptic shape. The distance, then, decreases as the buffing cloth 801 proceeds, and the fluff tips meet again when the buffing cloth 801 has finally arrived at the rear end portion 401R of the elliptic shape. According to this exemplary embodiment as described above, the fluff tips proceed smoothly. Therefore, even the shadowed portions S of the pole-like spacers 401 are reached by the fluff tips of the buffing cloth 802 to a sufficient degree.

According to the first exemplary embodiment as described above, the slope portions 410 are formed at the roots of the pole-like spacers 401, the pole-like spacers 401 have an elliptic shape in cross-section, and are arranged to maintain a predetermined relationship to the rubbing direction RD, thus making it possible to greatly decrease the poorly oriented regions. Therefore, the electro-optical device according to the first exemplary embodiment does hardly permit light to leak that stems from the presence of poorly oriented regions, and displays images maintaining higher quality than that of the related art is possible.

As described above, further, the pole-like spacers 401 according to the first exemplary embodiment make it possible to greatly decrease the poorly oriented regions RN, and hence to decrease the width or the area of the light-shielding film 23 (see FIG. 3). Namely, in the related art as shown in FIGS. 7(a) and 7(b), the width of the light-shielding film 23 had to be increased to conceal the poorly oriented regions RN, thus resulting in a decrease in the numerical aperture. In the first exemplary embodiment, the areas of the poorly oriented regions RN decrease greatly, and the width of the light-shielding film 23 can be decreased correspondingly as compared to the related art. Therefore, the first exemplary embodiment provides an electro-optical device of a high numerical aperture capable of displaying bright images.

In the above exemplary embodiment, the pole-like spacers were provided within the width of the light-shielding film. Even when no light-shielding film is formed, the pole-like spacers may be arranged anywhere when they do not affect the display of images.

Second Exemplary Embodiment

Figure 9:
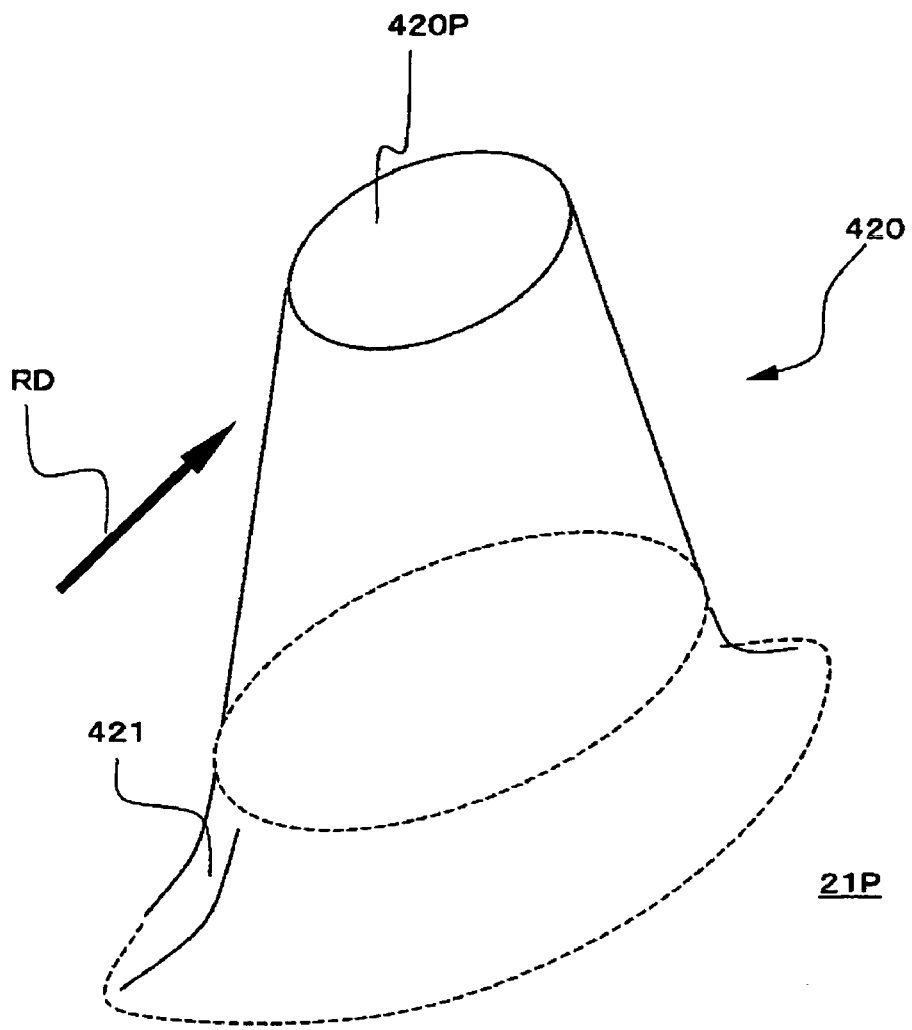
FIG. 9 is a perspective view having the same purport as that of FIG. 4, and illustrates the overall shape of a pole-like spacer according to a second exemplary embodiment of the invention.

A second exemplary embodiment of the invention is described below with reference to FIG. 9. FIG. 9 is a schematic having the same purport as that of FIG. 4, and is a perspective view illustrating the general shape of the pole-like spacer according to the second exemplary embodiment. The general constitution of the electro-optical device of the second exemplary embodiment is the same as that of the above first exemplary embodiment. Therefore, the following description deals chiefly with characteristic portions of the second only, and omits or only briefly describes the points already appeared in the above first exemplary embodiment.

The pole-like spacers 420 according to the second exemplary embodiment have such a shape that, as shown in FIG. 9, the sectional area on a plane in parallel with the to-be-provided surface 21P becomes the greatest on a plane that comes in contact with the to-be-provided surface 21P, and gradually decreases as it departs from the to-be-provided surface 21P. More concretely, the pole-like spacers 420 have a generally elliptic conical shape. Here, however, the formation of the slope portion 421, arrangement of the pole-like spacers 420 in the rubbing direction RD, and formation of a flat surface 420P at the head end of the pole-like spacers 420, are the same as those of the above first exemplary embodiment.

Even this exemplary embodiment accomplishes the advantages, which are nearly the same as those described in the above first exemplary embodiment. In the second exemplary embodiment, in particular, the pole-like spacers 420 have such a shape that the sectional area thereof gradually decreases as it departs from the to-be-provided surface 21P, thus enabling the fluff tips of the buffing cloth 802 to move more smoothly and further decreasing the probability of causing poor orientation.

In the second exemplary embodiment, in particular, the pole-like spacers 420' may have a semi-elliptic spherical shape, as shown in FIGS. 10(a) and 10(b). Here, FIG. 10(a) is a plan view and FIG. 10(b) is a sectional view. Depending upon the cases, the pole-like spacers may have a semi-spherical shape. In either case, the above features related to the sectional area are also satisfied by the above pole-like spacers 420', and advantages nearly the same as those described above are obtained. The pole-like spacers 420' have no flat surface at the head end thereof unlike the pole-like spacers 401 of the first exemplary embodiment, which, however, are also encompassed by the present invention, as a matter of course. Further, though not illustrated, even those pole-like spacers of a semi-elliptic spherical shape or a semi-spherical shape may, depending upon the cases, it can be easily assumed to have their head portions cut off. Namely, even in FIGS. 10(a) and 10(b), the pole-like spacers may have a flat surface at the head end thereof.

Figure 11:
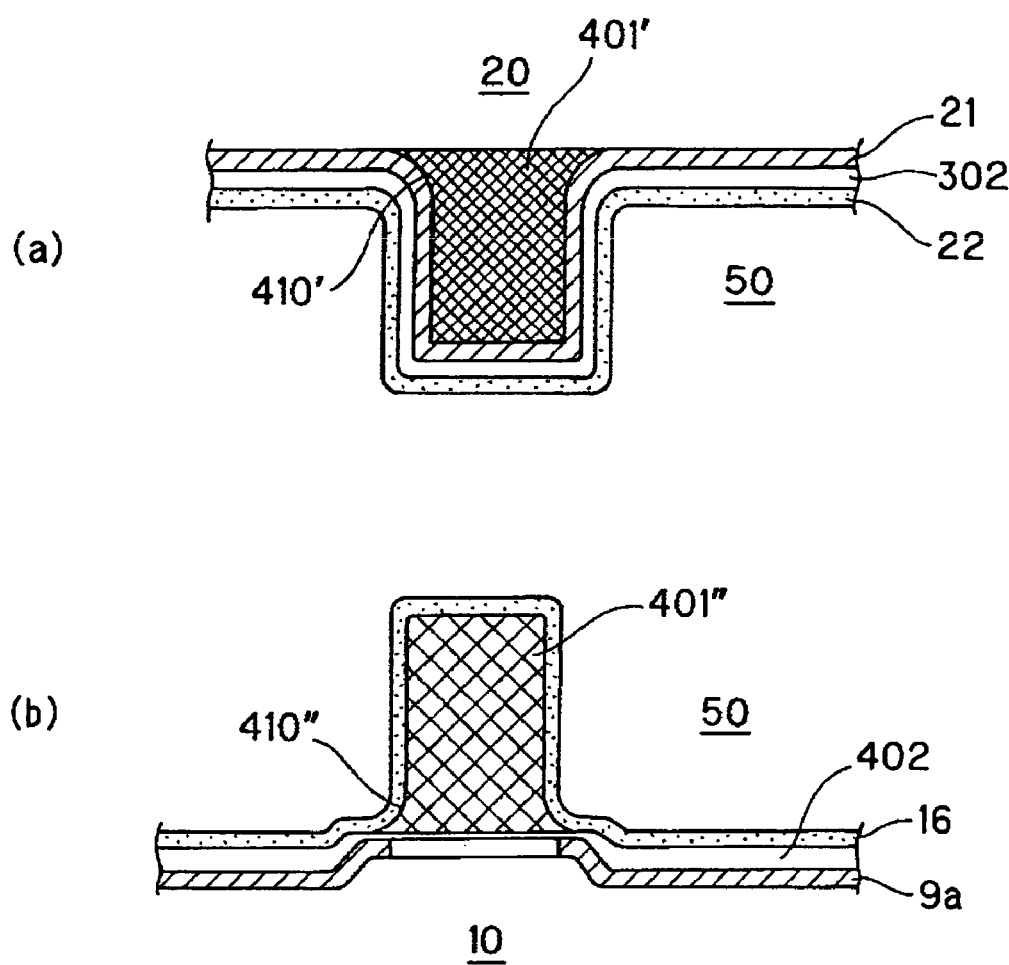
FIGS. 11(a) and 11(b) are sectional views illustrating various exemplary modifications of the pole-like spacer.

In the above exemplary embodiments, the pole-like spacers 401, 420 and 420' were formed on the side of the counter substrate 20 constituting poles of an acrylic resin on the orientation film 23, however, the invention is in no way limited to such exemplary embodiments. For example, there can be contrived a variety of modifications as illustrated in FIGS. 11(a) and (b).

At first, referring to FIG. 11(a), the pole-like spacers 401' may be formed by patterning by using the light-shielding film as an insulating material layer, which is under (upper side in the drawing) the counter electrode 21 formed of an ITO film, on the counter substrate 20. In this case, a transparent insulating film 302 may be formed between the pixel electrode 9a and the counter electrode 21 (at least on either one of the substrates) to reduce or prevent short-circuiting between them. As shown in FIG. 11(b), further, the pole-like spacers 401" may be provided on the side of the TFT array substrate. In this case, the pole-like spacers 401" are formed on the pixel electrodes 9a via a transparent insulating film 402, and the orientation film 22 on the side of the counter substrate 20 (not shown) may be rubbed.

In any way, even the pole-like spacers 401' and 401" of these modified exemplary embodiments have the slope portions 410' and 410" formed at the roots thereof and, hence, exhibit advantages similar to those described above.

Instead of patterning a suitable organic material, the pole-like spacers may be formed by forming partitioning walls utilizing protruded portions other than the grooves, by forming grooves (recessed portions) in the substrate except the regions where the pole-like spacers are to be formed, such as forming grooves in the substrate (counter substrate 20 or TFT array substrate 10) or in the inter-layer insulating film laminated on the substrate by, for example, etching. Also in this case, a transparent insulating film may be formed to prevent the short-circuiting between the pixel electrode 9a and the counter electrode 21 like in the case of the modified exemplary embodiment of FIG. 11.

(Circuit Constitution and Operation of the Electro-Optical Device)

Figure 12:
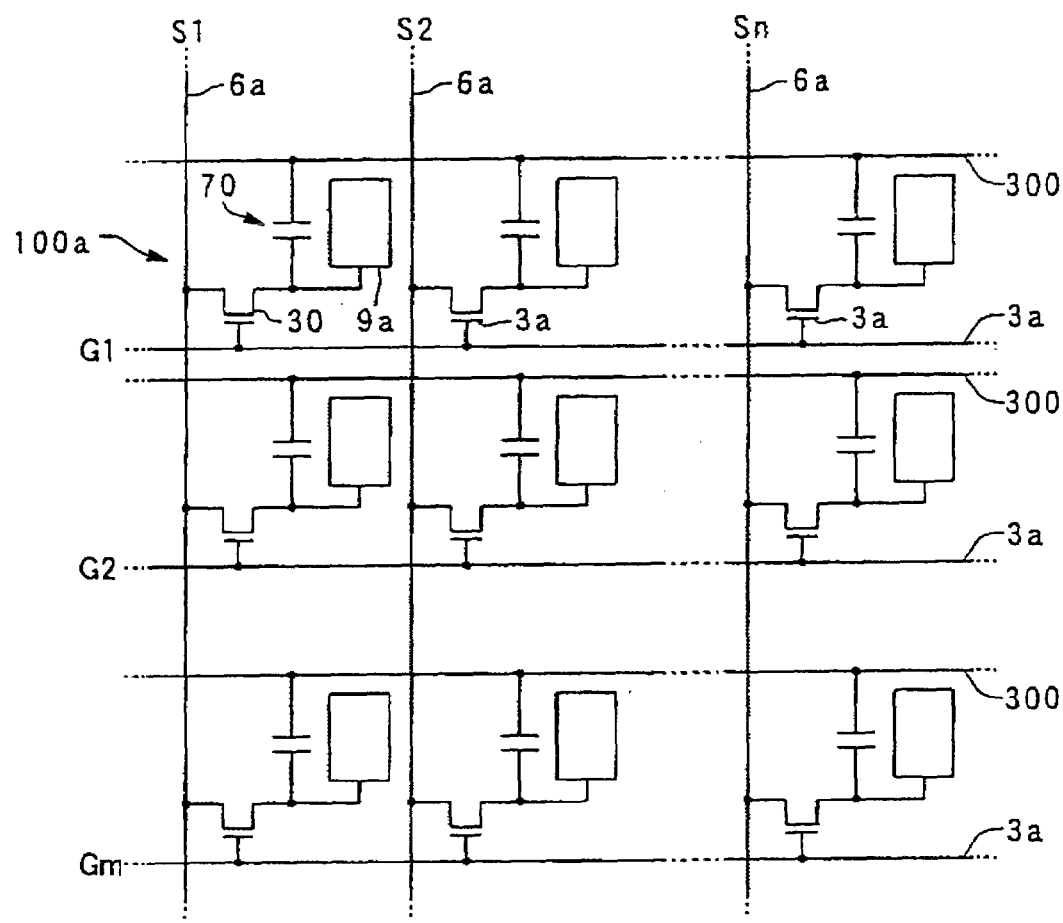
FIG. 12 is a schematic of an equivalent circuit of various elements and wirings provided for a plurality of pixels arranged like a matrix to constitute an image display region in the electro-optical device according to an exemplary embodiment of the invention.

Described below with reference to FIG. 12 is how the pixel electrode 9a and the like are driven in the electro-optical device constituted as described above. FIG. 12 is a schematic of an equivalent circuit of various elements and wirings in a plurality of pixels 100a formed like a matrix to constitute the image display region in the electro-optical device.

In FIG. 12, each of the plurality of pixels 100a includes a pixel electrode 9a and a TFT 30 to switch-control the pixel electrode 9a. Data lines 6a served with image signals are electrically connected to the sources of the TFTs 30. Image signals S1, S2, . . . , Sn to be written into the data lines 6a may be successively supplied in order of the lines, or may be supplied for each of the groups for a plurality of data lines 6a neighboring to each other.

Scanning lines 3a are electrically connected to the gates of the TFTs 30, and scanning signals G1, G2, . . . , Gm are successively applied like pulses to the scanning lines 3a in order of the lines. The pixel electrodes 9a are electrically connected to the drains of the TFTs 30. Upon closing the TFTs 30, which are the switching elements, for only a predetermined period of time, the image signals S1, S2, . . . , Sn fed from the data lines 6a are written at predetermined timings.

The image signals S1, S2, . . . , Sn of a predetermined level, written into liquid crystals which are an example of an electro-optical substance, via the pixel electrodes 9a, are held for a predetermined period of time between the pixel electrodes 9a and the counter electrodes 21 formed on the counter substrate 20. The orientation and order of liquid crystals as a molecular set varies depending upon the applied voltage level, whereby light is modulated to produce a gray scale display. In a normally white mode, the transmission factor for the incident light decreases depending upon the applied voltage with each pixel 100a as a unit. In a normally black mode, the transmission factor for the incident light increases depending upon the applied voltage with each pixel 100a as a unit. Therefore, the electro-optical device as a whole emits light having a contrast that varies depending upon the image signals.

Storage capacitors 70 are often added in parallel with the liquid crystal capacities formed between the pixel electrodes 9a and the counter electrodes 21 in order to reduce or prevent the leakage of image signals that are being held. For example, the voltage of the pixel electrode 9a is held by the storage capacitor 70 for a period of time, which is longer by hundreds of times than the time in which the source voltage is applied. This improves charge holding characteristics, and an electro-optical device having a high contrast ratio is realized. The storage capacitor 70 can be formed by forming a capacitor line 300 which is a specially dedicated wiring, or by being formed with the scanning line 3a in the preceding stage.

(Actual Constitution of TFTs and Their Peripheries)

Figure 13:
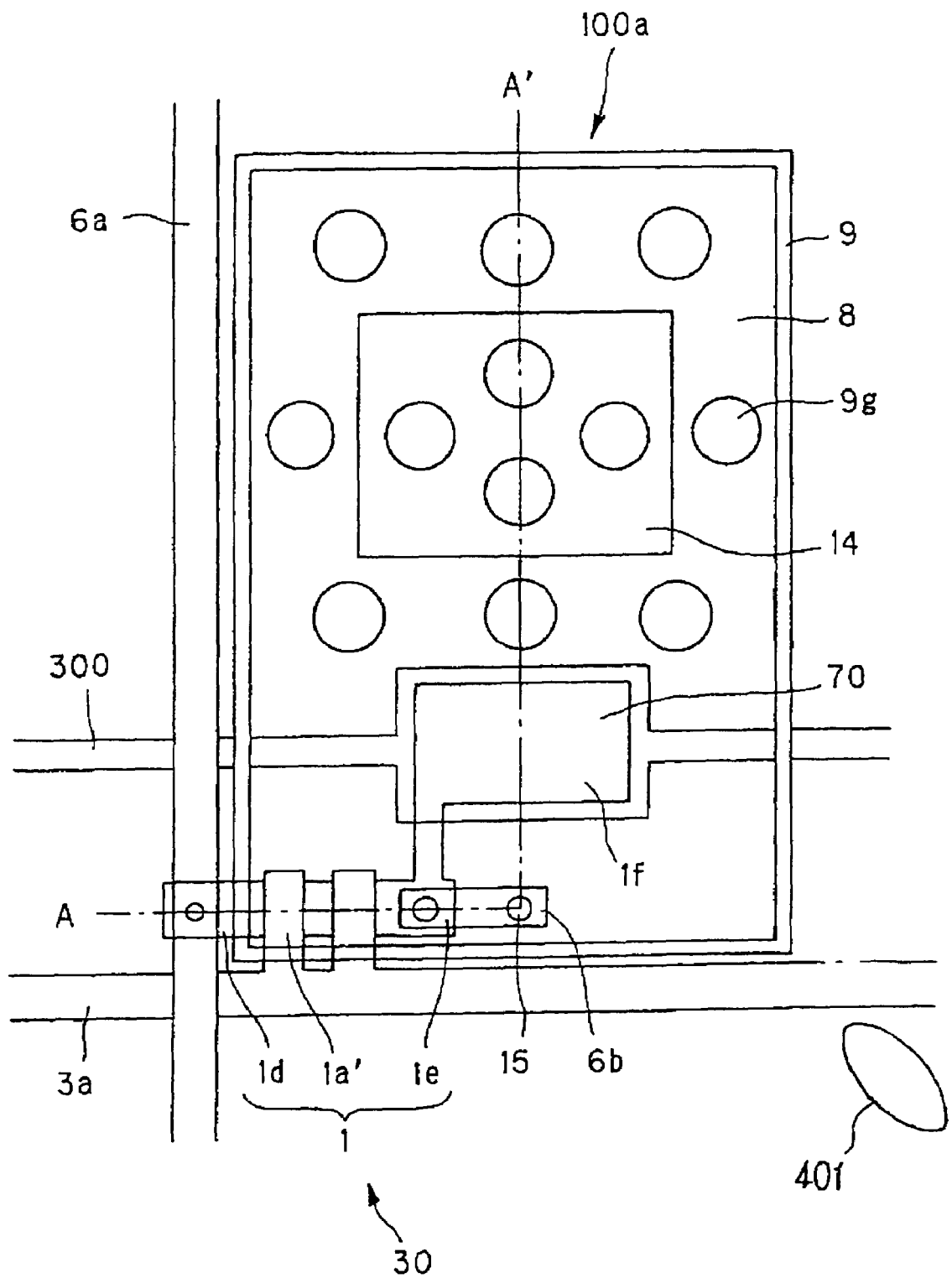
FIG. 13 is a plan view of a plurality of pixel groups neighboring each other on a TFT array substrate.
Figure 14:
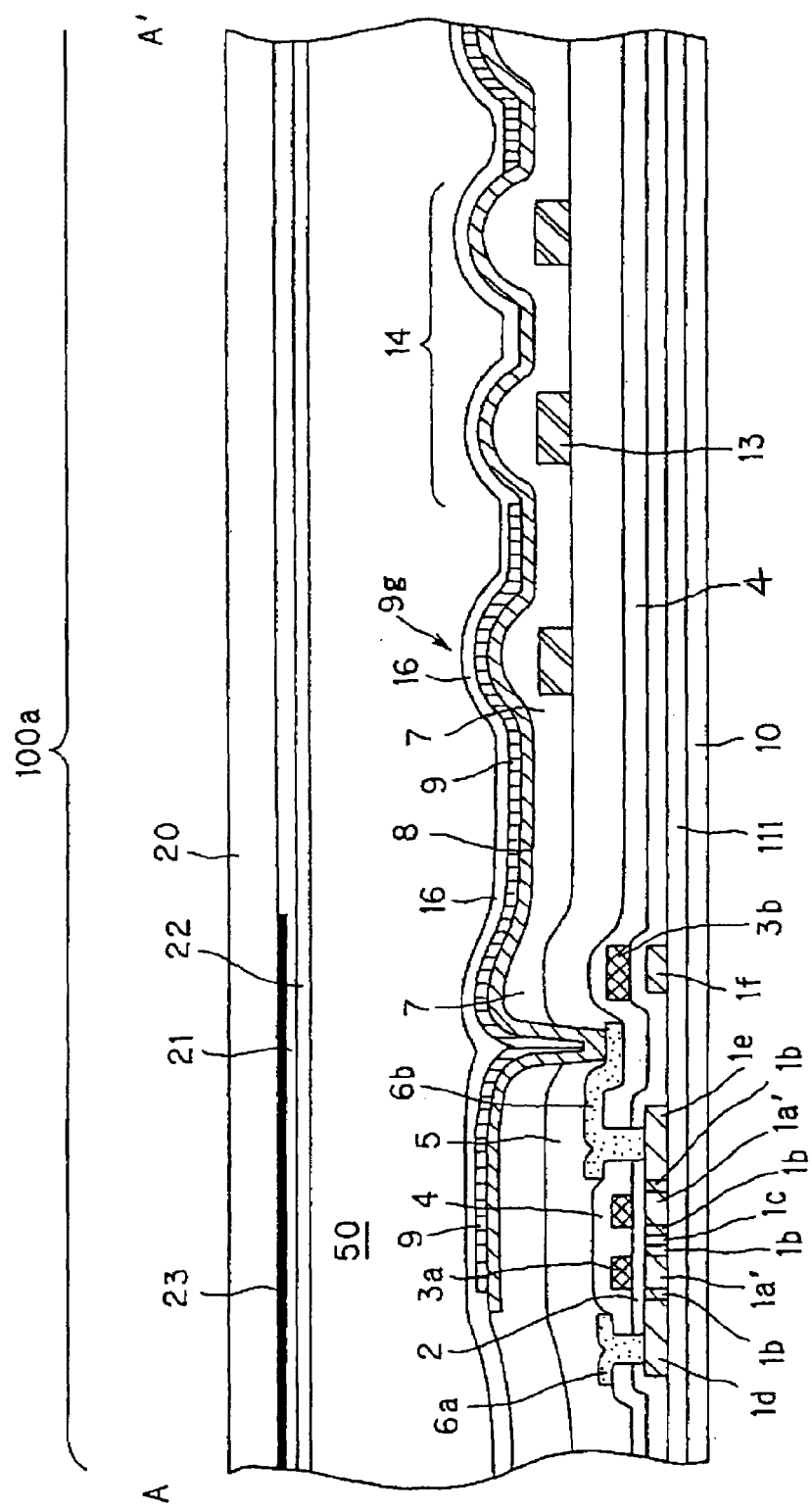
FIG. 14 is a sectional view taken along plane A–A' in FIG. 13.

Actually, the above pixels 100a have constitutions as shown in FIGS. 13 and 14. Here, FIG. 13 is a plan view of a plurality of groups of pixels neighboring to each other on the TFT array substrate according to an embodiment of the invention, and FIG. 14 is a sectional view taken along plane A–A' in FIG. 13. In FIGS. 13 and 14, only one pixel is illustrated in detail.

In FIG. 13, on the TFT array substrate are provided transparent electrodes 8, reflection electrodes 9 and the like in addition to TFTs 30, scanning lines 3a, data lines 6a and storage capacitors 70 described above. The pixel electrode 9a described above is a term which includes both the transparent electrode 8 and the reflection electrode 9 described above.

Among them, the reflection electrodes 9 are formed like a matrix on the TFT array substrate 10. As shown in FIG. 13, a transmission window 14 is formed in each of the reflection electrodes 9, and a region corresponding to the transmission window 14 is covered with the transparent electrode 8. The reflection electrodes 9 are constituted by aluminum film, or silver film, or an alloy thereof. Or the reflection electrodes 9 are constituted by the film laminated with titanium, or titanium nitride, or molybdenum or tantalum, or laminated those films. The transparent electrodes 8 are constituted by an ITO (indium-tin oxide) or the like.

Particularly, in this exemplary embodiment, as described already with reference to FIGS. 3 to 5, the pole-like spacers 401 having an elliptic shape in cross section are provided at positions corresponding to the corners of the reflection electrodes 9 (see FIG. 13).

As described above, the data lines 6a, scanning lines 3a and capacitor lines 300 are formed along the longitudinal and transverse boundaries of the reflection electrodes 9 and the transparent electrodes 8 that are arranged like a matrix, and the TFT 30 to switch the pixel is electrically connected to each of the reflection electrodes 9 via the transparent electrode 8. The data lines 6a are formed of, for example, aluminum or the like, and the scanning lines 3a and the capacitor lines 300 are formed of, for example, electrically conductive polysilicon or the like. As shown in FIGS. 13 and 14, the TFT 30 has a semiconductor layer 1a, in which are introduced suitable impurities, so as to form a high-density source region 1d, a high-density drain region 1e and a channel region 1a'. Among them, the data line 6a is electrically connected to the high-density source region 1d of the TFT 30 via a contact hole, and the transparent electrode 8 is electrically connected to the high-density drain region 1e via the source line 6b and the contact hole 15. Further, the scanning line 3a is extending on the channel region 1a' of the TFT 30, facing thereto via a gate-insulating film 2. As shown in FIGS. 13 and 14, the TFT 30 in this exemplary embodiment has a so-called double gate structure, where the semiconductor layer 1a is forming each region, i.e., a high-density source region 1d, a low-density region 1b, a channel region 1a', a low-density region 1b, a channel region 1a', a low-density region 1b and a high-density drain region 1e from the left side in the drawing. Further, the electro-optical device according to this exemplary embodiment includes storage capacitors 70. The storage capacitor 70 is of a structure including a lower electrode formed by an electrically conductive portion 1f extending from a semiconductor film 1 that is forming the TFT 30 to switch the pixel, an upper electrode of a capacitor line 300 which is of the same layer as the scanning line 3a, and a dielectric film of TaOx or SiOx interposed therebetween. Upon being provided with the above storage capacitors 70, it is allowed to strikingly enhance the charge-holding characteristics of the liquid crystal capacitor.

On the other hand, under the reflection electrode 9 and the transparent electrode 8 as shown in FIG. 14, there are formed a ruggedness-forming layer 13 and a rugged layer 7 (both of which are not illustrated in FIG. 13). The ruggedness-forming layer 13 and the rugged layer 7 are formed of, for example, a photosensitive resin such as an organic resin. The former layer is, particularly, formed as to include blocks which are scattered on the substrate surface, and the latter layer is formed so as to cover the whole surface of the substrate including the ruggedness-forming layer 13. Therefore, the surface of the rugged layer 7 undergoes a so-called "undulation" depending upon the blocks scattered in the ruggedness-forming layer 13, and thus a rugged pattern 9g is formed. In FIG. 13, the rugged pattern 9g is shown by circles, and the circular portions are protruding toward the front face of the paper, compared to other portions. That is, the rugged layer 7 and the blocks are formed under the circular portions, toward the back face of the paper. (see FIG. 14).

In the thus constituted electro-optical device of this exemplary embodiment, by utilizing the transparent electrodes 8 and transparent windows 14, it is possible to display the image in the transmission mode, and to display the image in the reflection mode by utilizing the reflection electrodes 9 and the ruggedness-forming layer 13 as well as the rugged layer 7 and the rugged pattern 9g. Namely, the region defined by the former constitution is a transmission region in which light emitted from an internal source of light (not shown) transmits toward the front face from the back face of the paper surface in FIG. 13, and the region defined by the latter constitution is a reflection region where light is emitted from the front face of the paper toward the reflection electrode 9, reflected thereby, and is allowed to transmit toward the front face of the paper surface again. In the latter case, in particular, light is scattered and reflected by the rugged pattern 9g, and the image becomes less dependent upon the viewing angle.

In FIG. 14, on the TFT array substrate 10 is formed an underlying protection film 111 which is a silicon oxide film (insulating film) having a thickness of 100 to 500 nm. Above the underlying protection film 111 and on the TFT 30 are formed a first interlayer insulating film 4 which is a silicon oxide film having a thickness of 300 to 800 nm, and further formed a second interlayer insulating film 5 (surface protection film) which is a silicon nitride film having a thickness of 100 to 800 nm on the first interlayer insulating film 4. Depending upon the cases, however, the second interlayer insulating film 5 may not be formed. Further, an orientation film 16 is formed as the uppermost layer on the side of the TFT array substrate 10. In FIG. 14, further, there are formed contact holes to electrically connect various constituent elements. On the other hand, on the counter substrate 20, there are formed a light-shielding film 23 extending running along the gaps among the pixels 100a, and an counter electrode 21 and an orientation film 22 formed on the whole surface of the substrate, which are laminated in the order mentioned.

Though the foregoing description has dealt with the electro-optical device of the active matrix drive type, the invention is in no way limited to the above exemplary embodiments, and the invention can also be applied without large modification to the electro-optical device of the passive matrix drive system.

(Exemplary Electronic Equipment)

The thus constituted electronic optical device can be used as a display unit for various kinds of electronic equipment. Some of the examples are concretely described below with reference to FIGS. 15 to 17.

Figure 15:
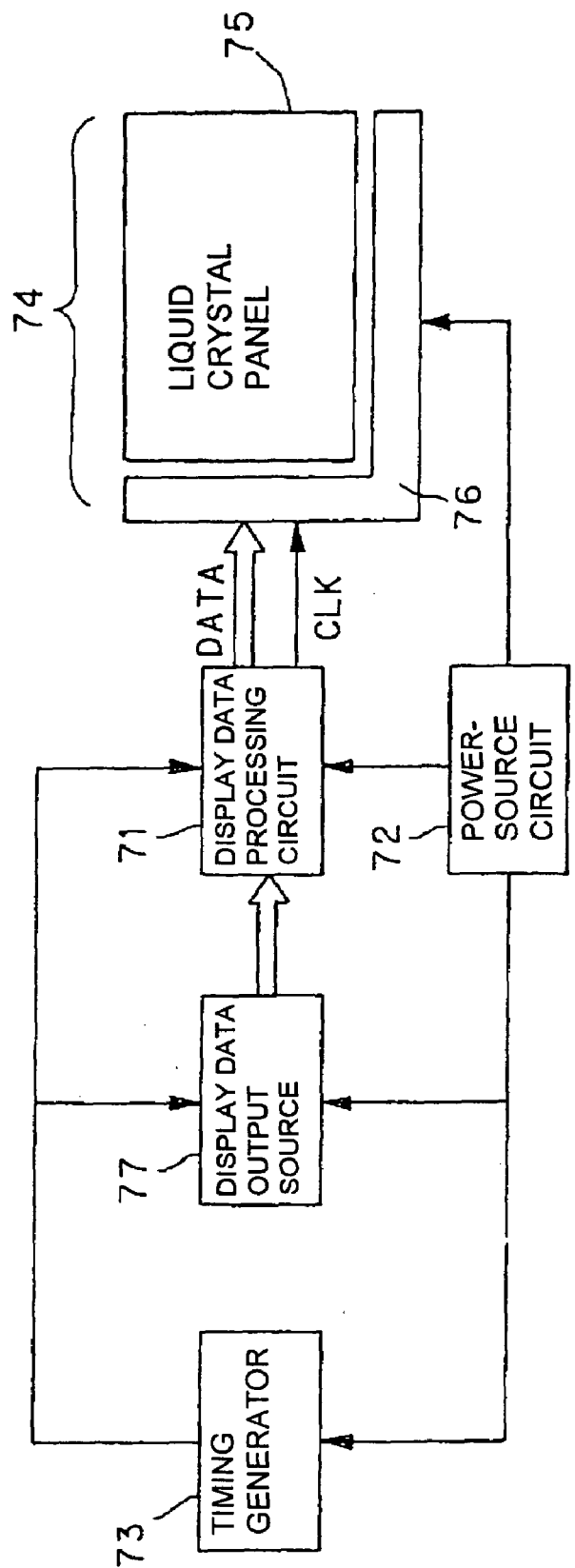
FIG. 15 is a schematic illustrating a circuit constitution of an electronic equipment using the electro-optical device of the invention as a display device.

FIG. 15 is a schematic illustrating a circuit constitution of an electronic equipment using the electro-optical device of this invention as a display device.

In FIG. 15, the electronic equipment includes a display data output source 77, a display data processing circuit 71, a power-source circuit 72, a timing generator 73 and a liquid crystal display device 74. The liquid crystal display device 74 includes a liquid crystal display panel 75 and a drive circuit 76. As the liquid crystal device 74, the electro-optical device described above may be used.

The display data output source 77 includes memories, such as ROM (read-only memory) and RAM (random access memory), as well as storage units such as disks of various kinds, and a tuning circuit to tune and producing digital image signals. The display data output source 70 feeds display data, such as image signals of a predetermined format to the display data processing circuit 71 based on clock signals of various kinds, generated by the timing generator 73.

The display data processing circuit 71 includes various related art or known circuits, such as a serial/parallel conversion circuit, an amplifier/inverter circuit, a rotation circuit, a gamma correction circuit and a clamping circuit, which executes the processing of input display data, and feeds the image signals to the drive circuit 76 together with the clock signals CLK. The power-source circuit 72 feeds a predetermined voltage to various constituent elements.

Figure 16:
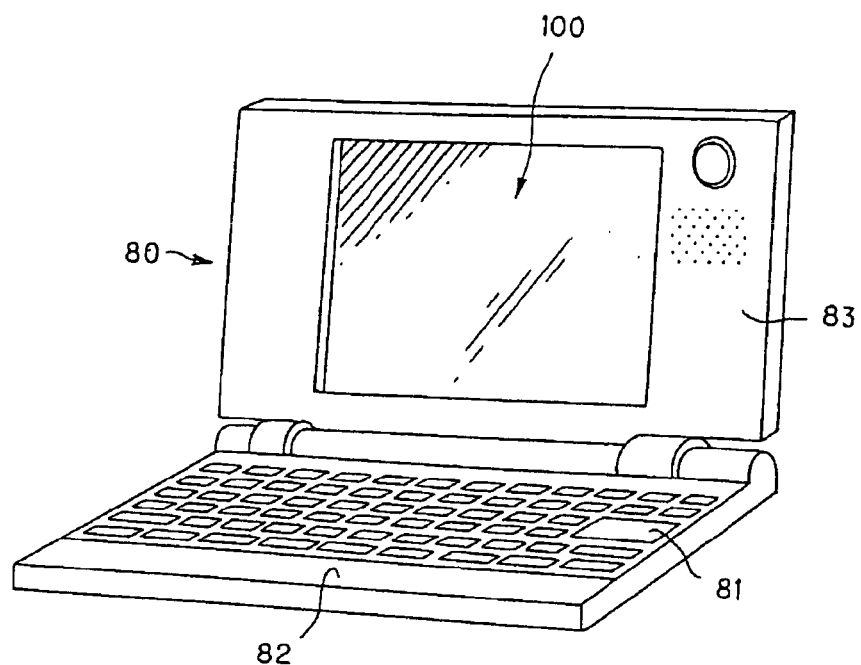
FIG. 16 is a schematic illustrating a mobile personal computer, which is an electronic equipment using the electro-optical device of the invention.

FIG. 16 illustrates a personal computer of the mobile type, which is an exemplary embodiment of the electronic equipment according to the invention. The personal computer 80 illustrated includes a main unit 82 having a keyboard 81, and a liquid crystal display unit 83. The liquid crystal display unit 83 includes the electro-optical device 100 described above.

Figure 17:
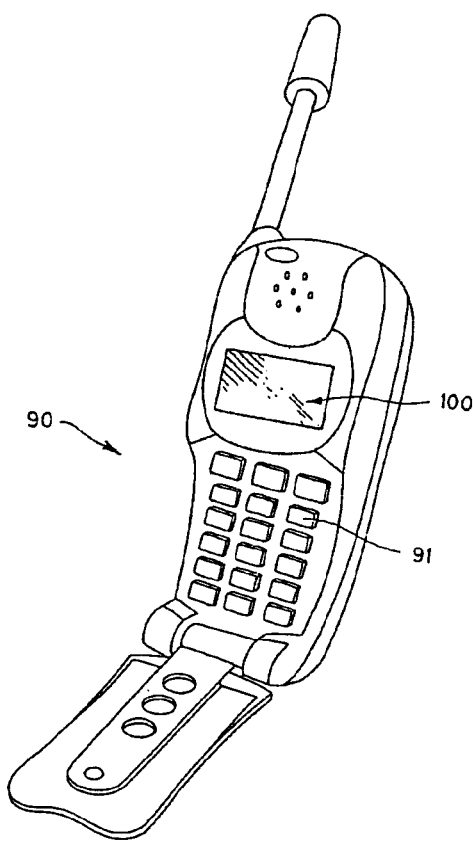
FIG. 17 is a schematic illustrating a cell phone, which is another example of electronic equipment using the electro-optical device of the invention.

FIG. 17 illustrates a cell phone, which is another electronic equipment. The cell phone 90 illustrated includes a plurality of operation buttons 91, and a display unit which includes the above electro-optical device 100.

The present invention is not limited to the above exemplary embodiments, but can be suitably modified without departing from the gist and spirit of the invention that can be comprehended from the claims and the specification of the application, and the electro-optical device and electronic equipment so modified are also encompassed within the technical scope of the invention.

What is claimed is:

1. An electro-optical device, comprising:
an electro-optical substance;
a pair of substrates holding the electro-optical substance; and
pole-like spacers provided on at least one substrate of the pair of substrates, on a to-be-provided surface of the at least one substrate facing the electro-optical substance, each pole-like spacer having an elongated sectional shape including a rounded head end portion and rear end portion in a direction of elongation, and at roots thereof, a slope portion with a surface connecting to the to-be-provided surface of the at least one substrate.

2. The electro-optical device according to claim 1, further including an orientation film formed on the to-be-provided surface of the at least one substrate, the pole-like spacers having an elliptic shape in cross-section on a plane in parallel with the to-be-provided surface, and a long diameter of the elliptic shape extending in a direction in agreement with a direction in which the orientation film is rubbed.

3. The electro-optical device according to claim 1, the slope portion being formed on an entire outer circumference of the pole-like spacers.

4. The electro-optical device according to claim 1, the pole-like spacers having a maximum area of sectional shape on a plane in parallel with the to-be-provided surface and in contact with the to-be-provided surface, and the area decreasing as it extends from the to-be-provided surface.

5. The electro-optical device according to claim 1, the pole-like spacers having at least one of a semi-spherical shape and a semi-elliptic spherical shape.

6. The electro-optical device according to claim 1, a top head end of the pole-like spacers including a flat surface.

7. The electro-optical device according to claim 1, further including:
a first striped wiring formed on the at least one substrate;
a second striped wiring formed on the at least one substrate or the other substrate, and extending in a direction that intersects the first striped wiring;
switching elements and pixel electrodes formed corresponding to regions where the second striped wiring and the first striped wiring intersect each other; and
a light-shielding film formed on the at least one substrate or the other substrate at a position corresponding to a position where the first striped wiring and the second striped wiring are formed;
the pole-like spacers being arranged within a width of the light-shielding film.

8. The electro-optical device according to claim 1, further including:
a first striped electrode formed on the at least one substrate;
a second striped electrode formed on the other substrate, and extending in a direction that intersects the first striped electrode; and
a light-shielding film formed on the at least one substrate or the other substrate except regions where the first striped electrode and the second striped electrode intersect each other;
the pole-like spacers being arranged within a width of the light-shielding film.

9. An electronic equipment, comprising:
the electro-optical device according to claim 1.

10. An electro-optical device, comprising:
an electro-optical substance;
a pair of substrates holding the electro-optical substance;

pole-like spacers provided on at least one substrate of the pair of substrates, on a to-be-provided surface of the at least one substrate facing the electro-optical substance, each pole-like spacer having an elliptic-shaped cross-section including a rounded head end portion and rear end portion in a direction of a major axis of the elliptic-shaped cross-section, and at roots thereof, a slope portion with a surface connecting to the to-be-provided surface of the at least one substrate; and an orientation film formed on the to-be-provided surface of the at least one substrate, the orientation film being rubbed in the direction of the major axis of the elliptic-shaped cross-section.

11. An electro-optical device comprising:
a TFT array substrate:
a counter substrate:
pixel electrodes formed on the TFT array substrate:
a counter electrode formed on the counter substrate:
an electro-optical substance held between the TFT array substrate and the counter substrate; and
a light-shielding film formed between the counter substrate and the counter electrode, the light-shielding film including pole-like spacers arranged along gaps among the pixel electrodes.

* * * * *